(12) United States Patent
Yoshida et al.

(10) Patent No.: US 11,134,197 B2
(45) Date of Patent: Sep. 28, 2021

(54) DRIVING DEVICE, IMAGE BLUR CORRECTION DEVICE, AND IMAGE PICKUP APPARATUS INCLUDING IMAGE BLUR CORRECTION DEVICE

(71) Applicant: CANON KABUSHIKI KAISHA, Tokyo (JP)

(72) Inventors: Shinsuke Yoshida, Tokyo (JP); Shunsuke Ninomiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/744,709

(22) Filed: Jan. 16, 2020

(65) Prior Publication Data
US 2020/0236285 A1    Jul. 23, 2020

(30) Foreign Application Priority Data

Jan. 23, 2019    (JP) .............................. JP2019-009070

(51) Int. Cl.
*H04N 5/232*    (2006.01)
*G03B 5/00*    (2021.01)
(Continued)

(52) U.S. Cl.
CPC ........... *H04N 5/23287* (2013.01); *G03B 5/00* (2013.01); *G03B 2205/0015* (2013.01); *G03B 2205/0061* (2013.01)

(58) Field of Classification Search
CPC ........... H04N 5/23287; H04N 5/23248; H04N 5/2253; G03B 5/00; G02B 27/646
See application file for complete search history.

(56) References Cited

U.S. PATENT DOCUMENTS

2006/0133786 A1*  6/2006  Teramoto ......... H04N 5/232933
                                                    396/55
2008/0284860 A1*  11/2008  Wu ..................... H04N 5/23248
                                                    348/208.7
(Continued)

FOREIGN PATENT DOCUMENTS

CN      101377603 A1    3/2009
CN      103852853 A1    6/2014
JP      2010-204276 A    9/2010

OTHER PUBLICATIONS

European Search Report dated Jul. 6, 2020, issued in the corresponding European Patent Application No. 20151916.2.

(Continued)

*Primary Examiner* — Christopher K Peterson
(74) *Attorney, Agent, or Firm* — Cowan, Liebowitz & Latman, P.C.

(57) ABSTRACT

Provided is an image blur correction device, including a driven member configured to hold a correction target member; a plurality of actuators configured to move a driven member within a plane; a first movable member configured to guide a movement of the driven member in a first direction; a second movable member configured to guide a movement of the driven member in a second direction different from the first direction; and a fixing member configured to movably hold the driven member, the first movable member, and the second movable member, wherein the fixing member is sandwiched at least between the driven member and the first movable member or between the driven member and the second movable member.

15 Claims, 6 Drawing Sheets

(51) Int. Cl.
*H04N 5/225* (2006.01)
*G02B 27/64* (2006.01)

(56) References Cited

U.S. PATENT DOCUMENTS

| | | |
|---|---|---|
| 2010/0209087 A1 | 8/2010 | Hayashi |
| 2012/0075519 A1 | 3/2012 | Blasch |
| 2016/0329836 A1* | 11/2016 | Sumioka ................ H02N 2/142 |
| 2017/0324905 A1 | 11/2017 | Yu |

OTHER PUBLICATIONS

Aug. 2, 2021 Chinese Office Action, which is enclosed with an English Translation, that issued in Chinese Patent Application No. 202010052431.8.

\* cited by examiner

DRIVING DEVICE, IMAGE BLUR CORRECTION DEVICE, AND IMAGE PICKUP APPARATUS INCLUDING IMAGE BLUR CORRECTION DEVICE

BACKGROUND OF THE INVENTION

Field of the Invention

The present invention relates to a driving device, an image blur correction device, and an image pickup apparatus including an image blur correction device.

Description of the Related Art

There has hitherto been known an image blur correction device having the following configuration. Specifically, in order to prevent an image blur caused by a shake, the image blur correction device is configured to detect a shake condition of an optical device through use of a shake detection means and move optical elements in a direction orthogonal to an optical axis such as lenses and an image pickup element in accordance with a detection result. In a replacement lens or an optical device including the image blur correction device, the optical elements are moved in a direction of absorbing a shake within a plane orthogonal to the optical axis to correct shifting of an imaging position due to a shake, thereby eliminating the image blur.

In general, for example, a VCM or an ultrasonic motor is used as a drive source for moving optical elements. In any case, another mechanism is provided around optical elements to be moved. However, in order to reduce an outer shape dimension, downsizing in the direction orthogonal to the optical axis is required. In Japanese Patent Application Laid-Open No. 2010-204276, there is proposed a method of not only moving an image pickup element in two orthogonal directions within a plane along the direction orthogonal to the optical axis and rotationally moving the image pickup element. Further, a drive source is provided around the image pickup element in the direction orthogonal to the optical axis.

SUMMARY OF THE INVENTION

However, when the drive source is provided around the optical elements, the size can be reduced in an optical axis direction but is increased in the direction orthogonal to the optical axis.

The present disclosure has an object to provide a driving device and an image blur correction device which are downsized.

According to one embodiment of the present disclosure, there is provided an image blur correction device, including a driven member configured to hold a correction target member; a plurality of actuators configured to move the driven member within a plane; a first movable member configured to guide a movement of the driven member in a first direction; a second movable member configured to guide a movement of the driven member in a second direction different from the first direction; and a fixing member configured to movably hold the driven member, the first movable member, and the second movable member, wherein the fixing member is sandwiched at least between the driven member and the first movable member or between the driven member and the second movable member.

According to the present disclosure, a driving device and an image blur correction device which are downsized can be provided.

Further features of the present disclosure will become apparent from the following description of exemplary embodiments with reference to the attached drawings.

DESCRIPTION OF THE EMBODIMENTS

Embodiments will now be described in detail in accordance with the accompanying drawings.

Figure 1:
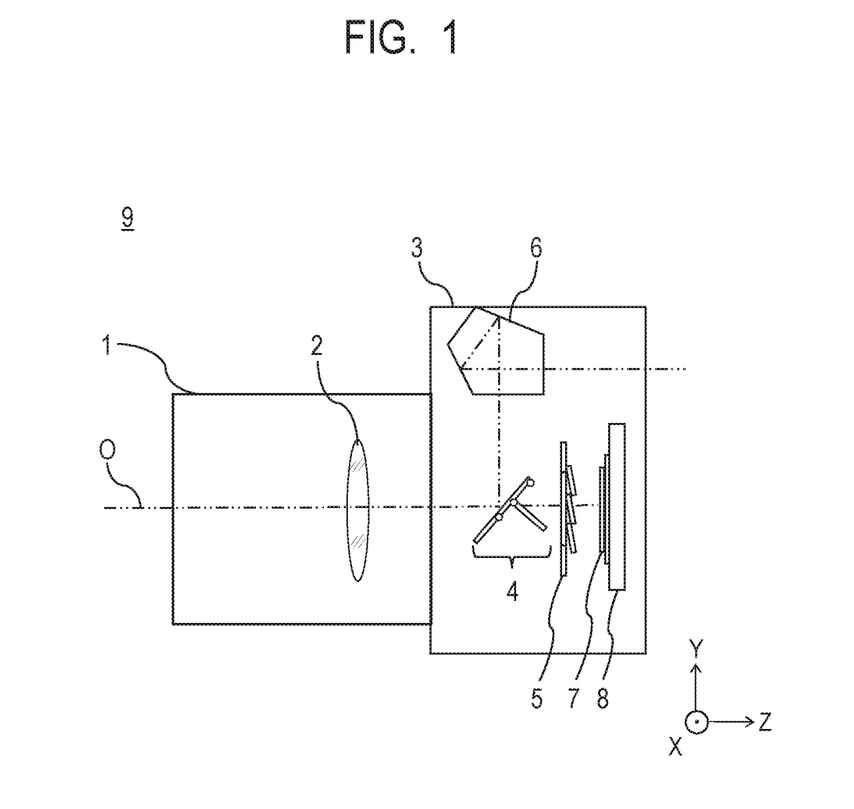
FIG. 1 is a schematic view for illustrating a cross section of a lens barrel 1 and a camera main body 3 in this embodiment.

FIG. 1 is a schematic view for illustrating a cross section of a schematic configuration of an image pickup apparatus 9 including an image blur correction device 8 according to an embodiment of the present disclosure. Specific examples of the image pickup apparatus 9 include digital cameras and digital video cameras. The image pickup apparatus 9 mainly includes a lens barrel 1 and a camera main body 3. The lens barrel 1 and the camera main body 3 may be integrated as in a case of a compact digital camera or may be separable as in a case of a digital single-lens reflex camera. Moreover, the image pickup apparatus 9 may be a mirrorless camera which does not include a mirror unit 4 and a prism 6 described later, or may have a configuration without a shutter unit 5. Although the image blur correction device 8 is described in the following description, a use of the embodiment is not limited to image blur correction and may be any driving device configured to move a member to be driven within a plane through use of a plurality of actuators.

For convenience of description, as illustrated in FIG. 1, a direction of an optical axis O of the lens barrel 1 is defined as "Z direction", and two directions orthogonal to each other within a plane orthogonal to the Z direction are defined as "X direction" (first direction) and "Y direction" (second direction). Moreover, under a state in which the Z direction matches a horizontal direction, the Y direction is parallel to a vertical direction, and hence the X direction is parallel to the horizontal direction.

In the following description, a case in which a correction target member described in claims is an image pickup element 7. However, as a matter of course, the correction target member may be a lens 2 provided inside the lens barrel 1, the case to be described does not limit the present disclosure. An angular velocity sensor and an acceleration sensor for image blur correction are provided inside the lens barrel 1 and the camera main body 3. Moreover, the lens barrel 1 includes a zoom lens group and a focus lens group (not shown). The mirror unit 4, the shutter unit 5, the prism 6, the image pickup element 7, and the image blur correction device 8 are provided inside the camera main body 3.

Under a state in which the image pickup apparatus 9 is ready for shooting, a light flux having been reflected on the mirror unit 4 is guided to an eye of an operator through the prism 6. At the time of shooting, the mirror unit 4 is brought into a mirror-up state, and the shutter unit 5 performs a shutter operation (exposure operation) at a predetermined speed. In such a manner, the light flux delivered from an object and passed through the lens barrel 1 is guided to the image pickup element 7, and is imaged as an optical image on an imaging surface of the image pickup element 7. As a result, an image is formed. The image pickup element 7 is a photoelectric conversion device such as a CCD sensor or a CMOS sensor, and is configured to convert an optical image into an electric signal through photoelectric conversion.

At the time of shooting, when an external force such as a vibration is applied to the image pickup apparatus 9, or an operator moves, a blur occurs in an image that is to be imaged on the imaging surface of the image pickup element 7, which may result in degradation in image quality. In order to correct (reduce) the image blur, the image blur correction device 8 is driven based on detection signals of the angular velocity sensor and the acceleration sensor provided in the lens barrel 1 or the camera main body 3 to move the image pickup element 7 being the correction target member within the plane orthogonal to the optical axis O.

The plane orthogonal to the optical axis O which can be regarded as being substantially orthogonal to the optical axis O in consideration of a dimension accuracy and an assembly accuracy of various components of the lens barrel 1 and the camera main body 3, and it is not required that the plane be physically orthogonal to the optical axis O in an extremely strict sense.

Figure 2A:
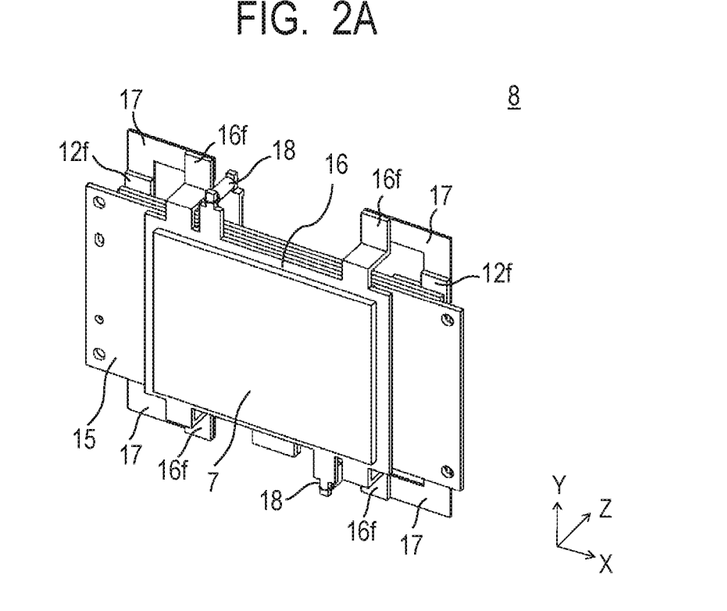
FIG. 2A and FIG. 2B are each a perspective views for illustrating an image blur correction device 8 according to this embodiment.
Figure 2B:
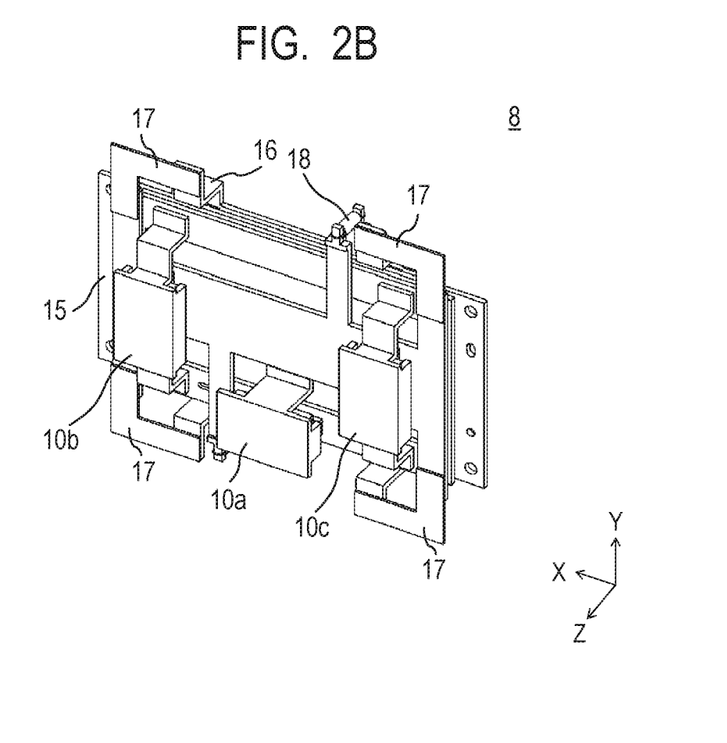
Figure 3A:
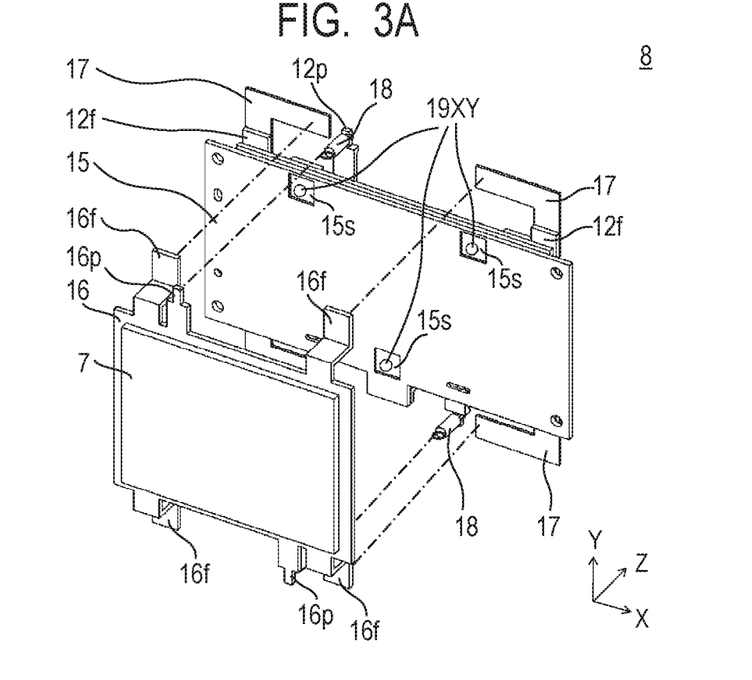
FIG. 3A and FIG. 3B are each an exploded perspective view for illustrating the image blur correction device 8 according to this embodiment.
Figure 3B:
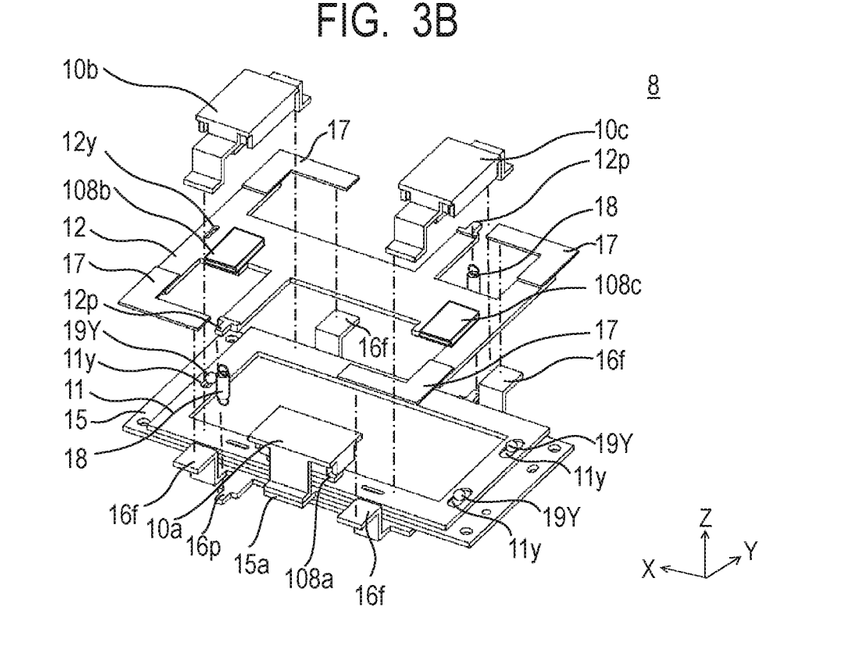
Figure 4:
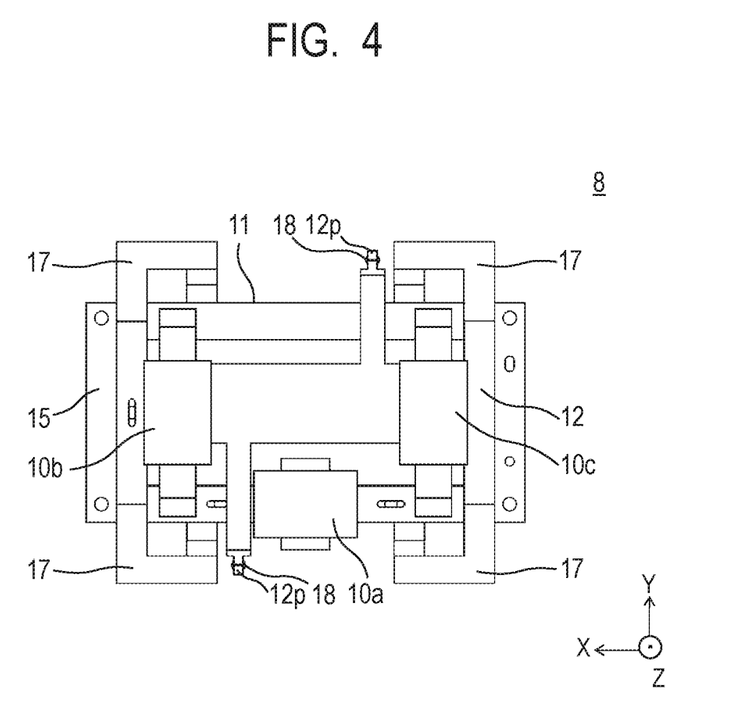
FIG. 4 is a back view for illustrating the image blur correction device 8 according to this embodiment.
Figure 5A:
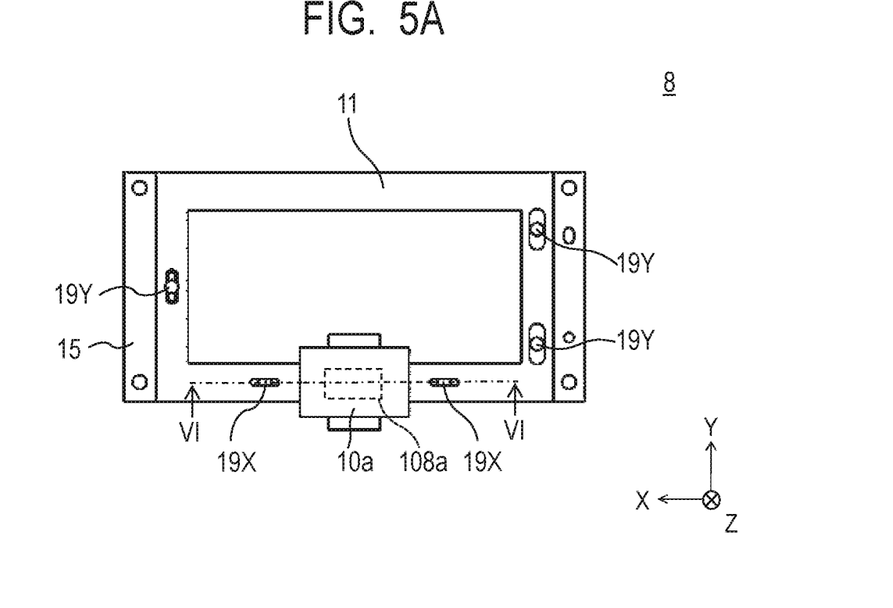
FIG. 5A is a back view for illustrating the image blur correction device 8 according to this embodiment.
Figure 5B:
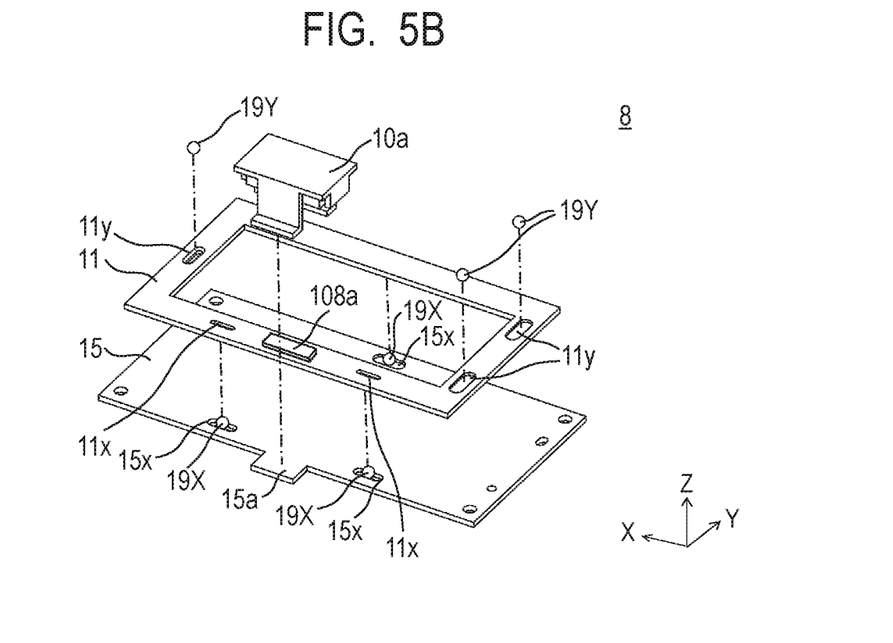
FIG. 5B is an exploded perspective view for illustrating the image blur correction device 8 according to this embodiment.
Figure 6:
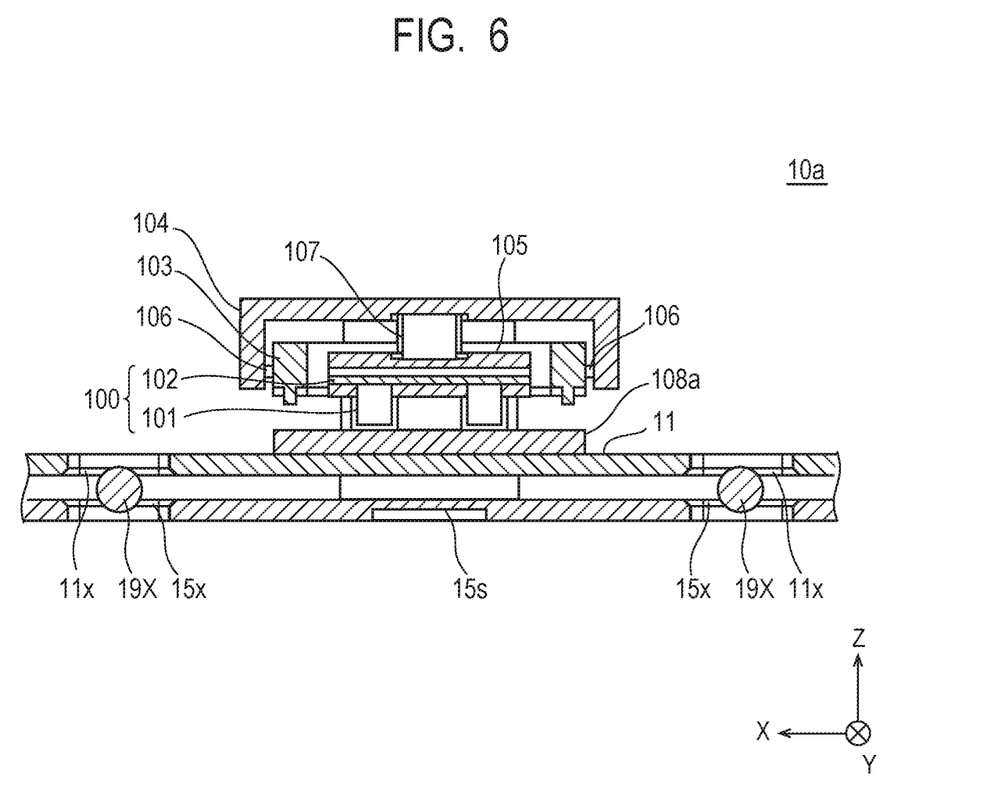
FIG. 6 is a sectional view for illustrating a first vibration wave motor 10a according to this embodiment.

Next, with reference to the drawings, a configuration of the image blur correction device 8 is described. FIG. 2A and FIG. 2B are perspective views for illustrating the image blur correction device 8 including the image pickup element 7, as viewed from different directions. FIG. 3A and FIG. 3B are exploded perspective views for illustrating the image blur correction device 8 including the image pickup element 7, as viewed from different directions. FIG. 4 is a back view for illustrating the image blur correction device 8. FIG. 5A is a back view for illustrating the image blur correction device 8 in which a second vibration wave motor 10b, a third vibration wave motor 10c, a second drive guide member 12, a driven member 16, and elastic coupling members 17, which are described later, are removed from the configuration of FIG. 4. FIG. 5B is an exploded perspective view of the configuration of FIG. 5A. FIG. 6 is a sectional view for illustrating a first vibration wave motor 10a serving as an actuator provided to the image blur correction device 8, and is a sectional view taken along the sectional line VI-VI of FIG. 5A as viewed from the Y direction. A movable member described in claims and a drive guide member described later correspond to each other. Further, a first actuator, a second actuator, and a third actuator described in claims correspond to the first vibration wave motor 10a, the second vibration wave motor 10b, and the third vibration wave motor 10c.

As illustrated in FIG. 2B, FIG. 3B, and FIG. 4, the first vibration wave motor 10a, the second vibration wave motor 10b, and the third vibration wave motor 10c serving as a plurality of actuators are used for the image blur correction device 8. Further, for ease of description below, configurations of the first vibration wave motor 10a, the second vibration wave motor 10b, and the third vibration wave motor 10c are all the same. Moreover, when the plurality of actuators is representatively described, the term "vibration wave motor 10" (ultrasonic motor) is used. However, the actuators may be a plurality of actuators having different configurations, or actuators such as VCM which operates with another principle, and the vibration wave motor 10 does not limit the present disclosure. In the following, using the first vibration wave motor 10a as an example, a configuration of the first vibration wave motor 10a is described with reference to FIG. 6.

A vibrator 100 includes a vibration plate 101, which is an elastic body, and a piezoelectric element 102. The vibration plate 101 and the piezoelectric element 102 are fixed to each other through use of, for example, a publicly-known adhesive, and the piezoelectric element 102 excites vibration (ultrasonic vibration) having a frequency in an ultrasonic range through application of a voltage to the piezoelectric element 102. The vibrator 100 and a vibrator holding member 103 are fixed to each other through use of, for example, a publicly-known adhesive.

A pressurizing mechanism holding member 104 is fixed to a fixing member 15 described later, for example, with screws (not shown). The pressurizing mechanism holding member 104 is coupled to the vibrator holding member 103 through intermediation of two rollers 106 which are arranged in pair. Through the intermediation of the two rollers 106, the pressurizing mechanism holding member 104 and the vibrator holding member 103 are coupled to each other in a driving direction and is freely movable in a pressurizing direction of a pressurizing spring 107 described later. As a result, irrespective of a posture of the vibrator 100, a driving force for the vibrator 100 can be obtained with high efficiency.

The vibrator 100 is brought into contact with a first friction member 108a by a pressurizing force of the pressurizing spring 107. An elastic member 105 is provided between the pressurizing spring 107 and the vibrator 100. The elastic member 105 prevents direct contact between the pressurizing spring 107 and the piezoelectric element 102, thereby preventing damage on the piezoelectric element 102.

The first friction member 108a is fixed to the first drive guide member 11 (first movable member), for example, with screws (not shown). Details of a relationship between the vibration wave motor 10, the first drive guide member 11, and the second drive guide member 12 are described later. When a drive voltage is applied to the piezoelectric element 102 under a pressurizing state of being pressurized by the pressurizing force of the pressurizing spring 107, an elliptic motion generated in the vibrator 100 is efficiently transmitted to the first friction member 108a. As a result, the first drive guide member 11 holding the first friction member 108a is movable in a predetermined direction.

Next, a configuration of the image blur correction device 8 is described in detail. The fixing member 15 forming the image blur correction device 8 is fixed to the camera main body 3, for example, with screws (not shown). As illustrated in FIG. 3B and FIG. 5B, the first vibration wave motor 10a is fixed to a fixing portion 15a of the fixing member 15, for example, with screws (not shown). An internal configuration of the first vibration wave motor 10a is illustrated in FIG. 6. In the description of this embodiment, the first vibration wave motor 10a generates a driving force in the X direction (first direction).

Three balls 19X are arranged between the first drive guide member 11 and the fixing member 15. The three balls 19X are loosely fitted (sandwiched) between three rolling grooves 15x of the fixing member 15 and three rolling grooves 11x of the first drive guide member 11. Those rolling grooves 15x and rolling grooves 11x are formed so as to extend in the same direction as the driving direction of the first vibration wave motor 10a, and serve to restrict the driving direction.

The first drive guide member 11 moves integrally with the first friction member 108a by the driving force generated by the first vibration wave motor 10a and the first friction member 108a. As described above, the three balls 19X roll between the fixing member 15 and the first drive guide member 11, and hence the first drive guide member 11 is movable with high efficiency.

As illustrated in FIG. 3B and FIG. 4, the second vibration wave motor 10b and the third vibration wave motor 10c are arranged substantially in parallel with each other, and are both held on the first drive guide member 11. Moreover, driving directions of the second vibration wave motor 10b and the third vibration wave motor 10c are directions being substantially orthogonal to the driving direction of the first vibration wave motor 10a.

A second friction member 108b and a third friction member 108c, which correspond respectively to the second vibration wave motor 10b and the third vibration wave motor 10c are both fixed to the second drive guide member 12 (second movable member). Moreover, three balls 19Y are arranged between the first drive guide member 11 and the second drive guide member 12. The three balls 19Y are loosely fitted (sandwiched) between three rolling grooves 11y of the first drive guide member 11 and three rolling grooves 12y of the second drive guide member 12. The rolling grooves 11y and the rolling grooves 12y are formed so as to extend in directions substantially orthogonal to the rolling grooves 15x and the rolling grooves 11x.

With such a configuration, when the second vibration wave motor 10b and the third vibration wave motor 10c are simultaneously driven, the second drive guide member 12 moves in the Y direction. When the third vibration wave motor 10c is driven, it is conceivable that drive of the second vibration wave motor 10b is delayed with respect to the third vibration wave motor 10c or is stopped. In such a case, the second drive guide member 12 moves to rotate about a contact position between the vibrator 100 of the second vibration wave motor 10b and the second friction member 108b.

As illustrated in FIG. 3A and FIG. 3B, four elastic coupling members 17 are coupled to fixing portions 12f of the second drive guide member 12, for example, with screws (not shown). The four elastic coupling members 17 are further coupled to fixing portions 16f of the driven member 16, for example, with screws (not shown). The elastic coupling members 17 are each formed of, for example, a metal thin plate. The elastic coupling members 17 each have a high strength in the X direction and the Y direction and have a function as an elastic body in the Z direction.

As illustrated in FIG. 2A and FIG. 3A, the driven member 16 holds an image pickup element 7 serving as a correction target member. The driven member 16 is in contact with the fixing member 15 through intermediation of three balls 19XY. The fixing member 15 includes three rolling surfaces 15s on which the three balls 19XY roll. The driven member 16 includes rolling portions (not shown) on which the three balls 19XY roll. The rolling surfaces 15s and rolling portions are each a flat surface, and none of those have a function of restricting the driving direction.

As described above, the elastic coupling members 17 each have a function as an elastic body in the Z direction. However, consideration is made of a case in which the driven member 16 and the second drive guide member 12 are coupled to each other with a member having a characteristic of being less likely to be elastically deformed. In such a case, there is a fear in that the driven member 16 is shifted in position or falls down due to dimensional errors of the first drive guide member 11, the second drive guide member 12, and the fixing member 15. However, through coupling with the elastic coupling members 17 each having the function as an elastic body, the dimensional errors described above can be absorbed by the elastic deformation of the elastic coupling members 17. As a result, a position of the driven member 16 in the Z direction can be determined only with dimensional errors of the fixing member 15 and the three balls 19XY.

With such a configuration, when the first vibration wave motor 10a is driven, the first drive guide member 11, the second vibration wave motor 10b, and the third vibration wave motor 10c integrally move. Further, when the second vibration wave motor 10b and the third vibration wave motor 10c are driven, the second drive guide member 12 moves. The second drive guide member 12 is coupled to the driven member 16 through intermediation of the elastic coupling members 17. Therefore, the second drive guide member 12 and the driven member 16 integrally move. As a result, the driven member 16 and the image pickup element 7 is capable of performing relative movement in the X direction and the Y direction with respect to the fixing member 15, and is also capable of performing relative rotational movement within an XY plane.

When the actuators and the drive guide members are provided so as to extend in the XY plane direction with respect to the correction target member as in the configuration of the related art, the apparatus is increased in size in the XY plane direction. The shutter unit 5 and batteries are arranged beside the image pickup element 7 inside the camera main body 3, and hence it is required that the image blur correction device 8 be reduced in size in the XY direction.

The present disclosure is characterized in that the fixing member 15 is sandwiched by the driven member 16 holding the image pickup element 7, the vibration wave motor 10 and the first drive guide member 11, and a part of the second drive guide member 12. With such a configuration, the image blur correction device 8 can be reduced in size in the X direction and the Y direction being directions orthogonal to the optical axis O.

As described above, the driven member 16 is coupled to the second drive guide member 12 through intermediation of the elastic coupling members 17, and the elastic coupling members 17 have a function as an elastic body in the Z direction. Thus, an elastic force for urging the driven member 16 in the Z direction is generated. Moreover, there is a case in which an urging force acts in a direction in which the driven member 16 separates from the fixing member 15 due to dimensional errors of the first drive guide member 11, the second drive guide member 12, the fixing member 15, and the driven member 16. However, the driven member 16 further includes two spring holding portions 16p, and is coupled to two spring holding portions 12p of the second drive guide member 12 through intermediation of an urging spring 18 (urging member). Further, when the urging force of the urging spring 18 is set so as to be larger than the elastic force of the elastic coupling members 17, the driven member 16 can be reliably urged against the fixing member 15.

The driven member 16 can be urged against the fixing member 15 also through coupling of the driven member 16 and the fixing member 15 to each other by a spring. However, due to relative movement of the driven member 16 with respect to the fixing member 15, a recovering force generated by relative extension and contraction of the spring in the X direction and the Y direction may act. In this case, the driving force of the vibration wave motor 10 is lost.

Meanwhile, the second drive guide member 12 and the driven member 16 move integrally with each other in the X direction and the Y direction, and hence the recovering force generated by relative extension and contraction of the urging spring 18 does not act. That is, the vibration wave motor 10 does not lose the driving force due to the recovering force of the elastic spring 18.

Moreover, the first drive guide member 11 and the driven member 16 can be coupled to each other with the urging spring 18. However, there is a case in which the recovering force described above may act due to relative movement of the first drive guide member 11 and the second drive guide member 12. In this case, the driving forces of the second vibration wave motor 10b and the third vibration wave motor 10c are lost. Therefore, it is most preferred that the second drive guide member 12 and the driven member 16 be coupled to each other with the urging spring 18.

In the description above, the mode in which the second vibration wave motor 10b and the third vibration wave motor 10c are provided to the first drive guide member 11 is described. However, this configuration does not limit the present disclosure. For example, only the second vibration wave motor 10b may be provided to the first drive guide member 11 so that the second drive guide member 12 moves with the driving force. In such a case, the third vibration wave motor 10c held on the second drive guide member 12 and the third drive guide member 13 (third movable member) driven by the third vibration wave motor 10c are provided. Thus, a similar effect can be attained even through coupling of the third drive guide member 13 and the driven member 16 through intermediation of the elastic coupling members 17. In such a case, the third drive guide member 13 and the driven member 16 are urged by the urging spring 18. Thus, the driving force of none of the vibration wave motors 10 is lost, and hence a favorable configuration can be obtained. The embodiment described above is merely a representative example, and various modifications and changes can be made on the embodiment at the time of practicing the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-009070, filed Jan. 23, 2019, which is hereby incorporated by reference herein in its entirety.

What is claimed is:

1. An image blur correction device, comprising
a driven member configured to hold a correction member;
a plurality of actuators, each of which is configured to include a vibration plate and a piezoelectric element and to move the driven member;
a first movable member configured to include a first contact portion is brought into contact with a first actuator of the plurality of actuators and to guide a movement of the driven member in a first direction;
a second movable member configured to include a second contact portion is brought into contact with a second actuator of the plurality of actuators and to guide a movement of the driven member in a second direction different from the first direction; and
a fixing member prevented from moving along with the movement of the driven member, the first movable member, or the second movable member,
wherein the fixing member is provided at a position adjacent to the driven member in a direction orthogonal to the first direction and the second direction, and is provided at a position between the driven member and the first movable member or between the driven member and the second movable member, and
wherein one of the first actuator and the second actuator is held on the fixing member, and the other is not held on the fixing member.

2. The image blur correction device according to claim 1, wherein the driven member and one of the first movable member or the second movable member to be coupled to the driven member are urged in a direction orthogonal to the first direction and the second direction.

3. The image blur correction device according to claim 1, wherein the driven member and one of the first movable member or the second movable member to be coupled to the driven member are coupled to each other so as to be integrally movable in one of the first direction or the second direction.

4. The image blur correction device according to claim 1, wherein the first actuator is configured to drive the first movable member.

5. The image blur correction device according to claim 4, wherein at least one of the second actuator or a third actuator of the plurality of actuators is held on the first movable member.

6. The image blur correction device according to claim 5, wherein at least one of the second actuator or the third actuator of the plurality of actuators is configured to drive the second movable member.

7. The image blur correction device according to claim 6, wherein the fixing member is configured to support the first movable member so that the first movable member is movable in the first direction.

8. The image blur correction device according to claim 7, wherein the first movable member is configured to support the second movable member so that the second movable member is movable in the second direction.

9. The image blur correction device according to claim 1, wherein the fixing member is configured to support the driven member so that the driven member is movable together with the first movable member and the second movable member.

10. The image blur correction device according to claim 1, wherein at least one of the plurality of actuators is located at a position overlapping the correction member in a direction orthogonal to the first direction and the second direction.

11. The image blur correction device according to claim 1, wherein the plurality of actuators are vibration wave motors.

12. The image blur correction device according to claim 11, wherein the vibration wave motor comprises an ultrasonic motor configured to vibrate with a frequency in an ultrasonic range.

13. An image pickup apparatus including an image blur correction device, comprising
   a driven member configured to hold a correction member;
   a plurality of actuators, each of which is configured to include a vibration plate and a piezoelectric element and to move the driven member;
   a first movable member configured to include a first contact portion is brought into contact with a first actuator of the plurality of actuators and to guide a movement of the driven member in a first direction;
   a second movable member configured to include a second contact portion is brought into contact with a second actuator of the plurality of actuators and to guide a movement of the driven member in a second direction different from the first direction; and
   a fixing member prevented from moving along with the movement of the driven member, the first movable member, or the second movable member,
   wherein the fixing member is provided at a position adjacent to the driven member in a direction orthogonal to the first direction and the second direction, and is provided at a position between the driven member and the first movable member or between the driven member and the second movable member, and
   wherein one of the first actuator and the second actuator is held on the fixing member, and the other is not held on the fixing member.

14. The image pickup apparatus according to claim 13, wherein the correction member is an image pickup element or a lens provided inside a lens barrel.

15. A driving device, comprising
   a driven member;
   a plurality of actuators, each of which is configured to include a vibration plate and a piezoelectric element and to move the driven member;
   a first movable member configured to include a first contact portion is brought into contact with a first actuator of the plurality of actuators and to guide a movement of the driven member in a first direction;
   a second movable member configured to include a second contact portion is brought into contact with a second actuator of the plurality of actuators and to guide a movement of the driven member in a second direction different from the first direction; and
   a fixing member prevented from moving along with the movement of the driven member, the first movable member, or the second movable member,
   wherein the fixing member is provided at a position adjacent to the driven member in a direction orthogonal to the first direction and the second direction, and is provided at a position between the driven member and the first movable member or between the driven member and the second movable member, and
   wherein one of the first actuator and the second actuator is held on the fixing member, and the other is not held on the fixing member.

* * * * *